US00RE46822E

(19) United States
(12) Reissued Patent
Moller-Lewin et al.

(10) Patent Number: US RE46,822 E
(45) Date of Reissued Patent: May 8, 2018

(54) MONITORING CAMERA

(71) Applicant: AXIS AB, Lund (SE)

(72) Inventors: Niclas Moller-Lewin, Malmo (SE); Mathias Andersson, Hoganas (SE); Mariano Vozzi, Malmo (SE); Andres Vigren, Hollviken (SE)

(73) Assignee: AXIS AB, Lund (SE)

(21) Appl. No.: 29/593,384

(22) Filed: Feb. 8, 2017

Related U.S. Patent Documents

Reissue of:

(64) Patent No.: Des. 753,751
Issued: Apr. 12, 2016
Appl. No.: 29/461,582
Filed: Jul. 25, 2013

(30) Foreign Application Priority Data

Jan. 25, 2013 (EM) ..... 001358469-01-04

(51) LOC (11) Cl. ..... 16-01

(52) U.S. Cl.
USPC ..... D16/203

(58) Field of Classification Search
USPC ..... D16/200, 202–206, 218, 219, 242; 348/143, 148, 151, 373–376; 396/419, 396/427, 535, 539–541
CPC ..... G03B 17/02; G03B 19/04; G03B 17/56; G03B 17/04; G03B 15/03; H04N 5/2251; H04N 5/2252; H04N 5/2253; H04N 5/2254; H04N 7/181; H04N 7/183; H04N 7/18; G08B 13/1963; G08B 13/19619; G08B 13/19632; F16M 11/04; F16M 13/00
See application file for complete search history.

(56) References Cited

U.S. PATENT DOCUMENTS

D582,460 S * 12/2008 Yoo et al. ..... D16/203
D589,995 S * 4/2009 Kellar et al. ..... D16/203
D635,172 S * 3/2011 Ko ..... D16/203
D635,173 S * 3/2011 Yamakawa ..... D16/203
D661,719 S * 6/2012 Katori et al. ..... D16/203
D669,108 S * 10/2012 Maeyama ..... D16/202
(Continued)

FOREIGN PATENT DOCUMENTS

TW D113621 10/1994

OTHER PUBLICATIONS http://www.bolideco.com Date prior to Jan. 25, 2013.
(Continued)

*Primary Examiner* — Phillip S Hyder
(74) *Attorney, Agent, or Firm* — Volpe and Koenig, P.C.

(57) CLAIM

The ornamental design for a monitoring camera, as shown and described.

DESCRIPTION

FIG. 1 is top, front and right side perspective view of a monitoring camera showing our new design;
FIG. 2 is bottom, rear and left side perspective view thereof;
FIG. 3 is a top plan view thereof;
FIG. 4 is a front elevational view thereof;
FIG. 5 is a left side elevational view thereof, the undisclosed right side elevational view being a mirror image of the left side elevation;
FIG. 6 is a bottom plan view thereof; and,
FIG. 7 is a rear elevational view thereof.
(Continued)

The broken lines depict portions of a monitoring camera in which the design is embodied and form no part of the claimed design.

1 Claim, 4 Drawing Sheets

Figure 1:
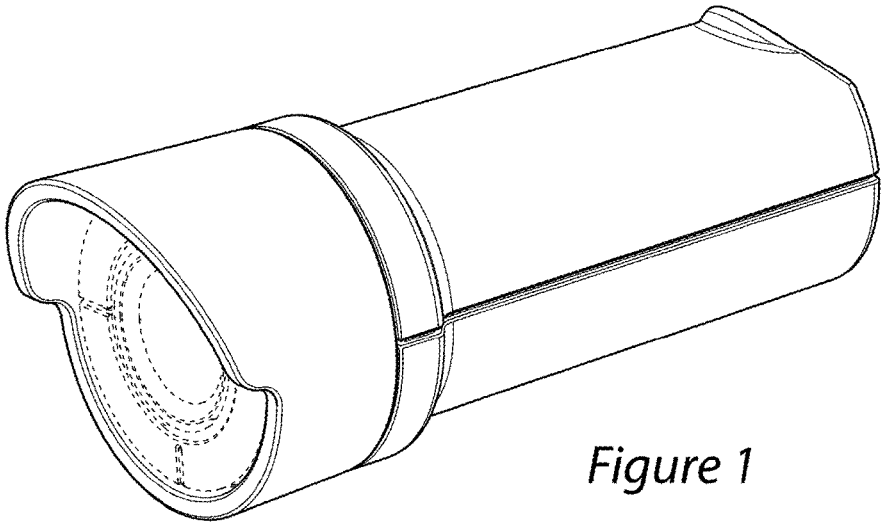
Figure 2:
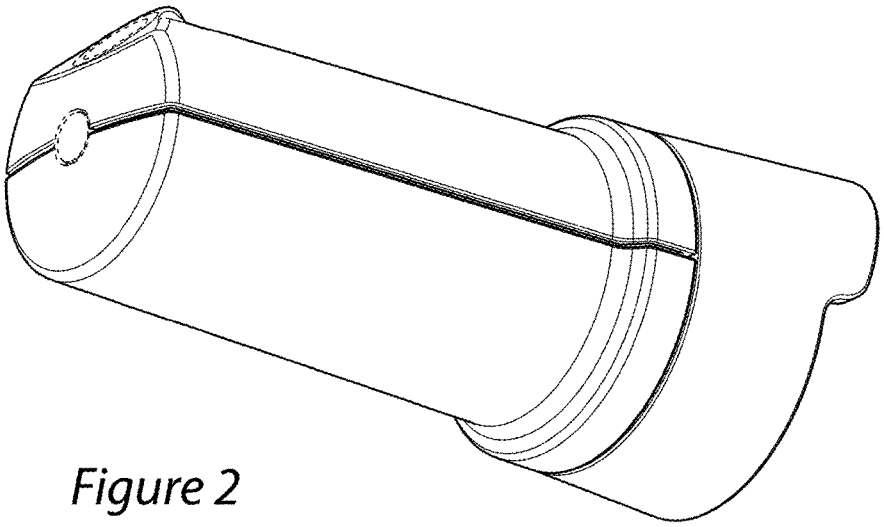
Figure 3:
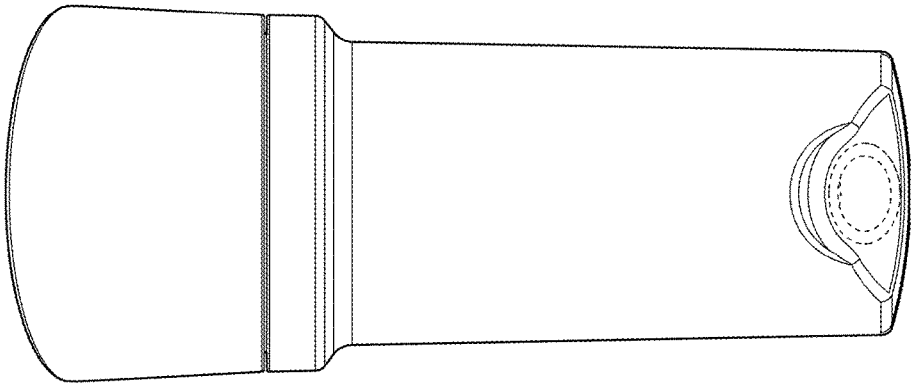
Figure 4:
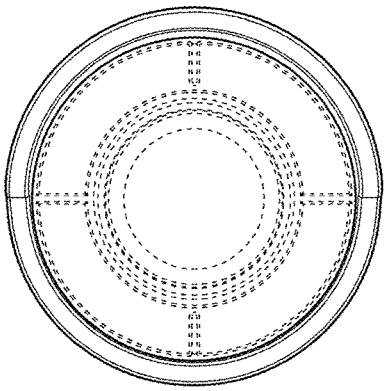
Figure 5:
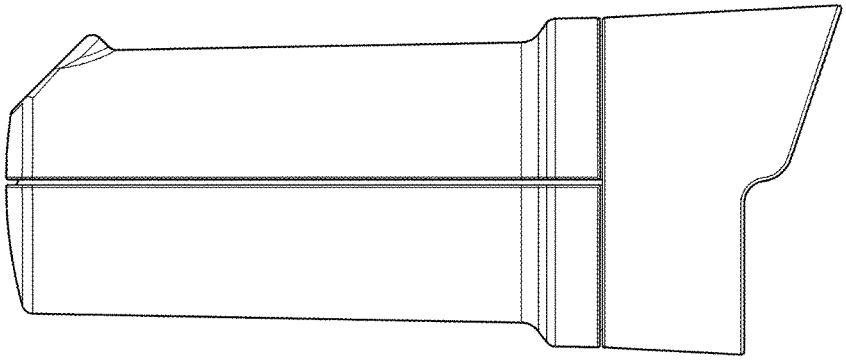
Figure 6:
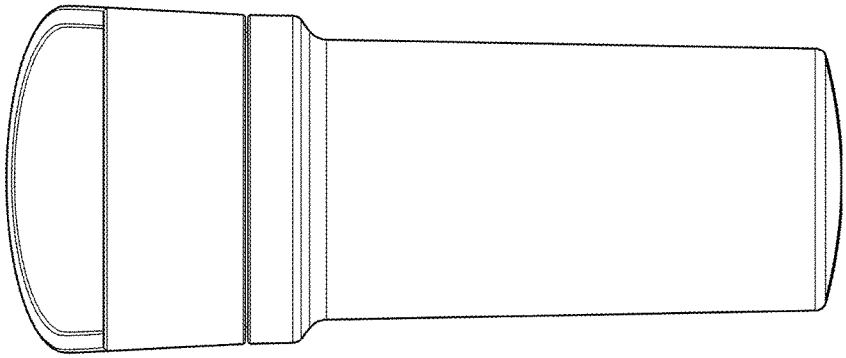
Figure 7:
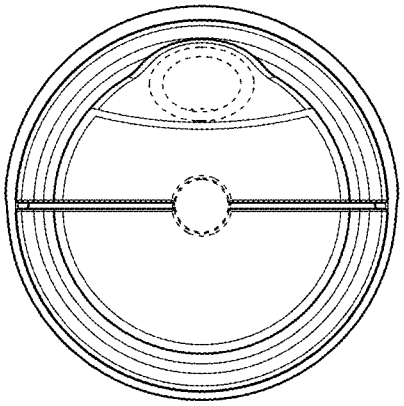

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D691,187 | S | * | 10/2013 | Seo et al. | D16/203 |
| D696,330 | S | * | 12/2013 | Matsumoto et al. | D16/203 |
| D702,274 | S | * | 4/2014 | Qian et al. | D16/203 |
| D721,756 | S | * | 1/2015 | Hallstrom et al. | D16/203 |
| 2008/0170121 | A1 | * | 7/2008 | Su et al. | G08B 13/19619 348/143 |
| 2010/0013922 | A1 | * | 1/2010 | Cheng | G08B 13/19619 348/143 |

OTHER PUBLICATIONS http://www.pistore.com/equipment-cameras-bullet-c-2_207.html Date prior to Jan. 25, 2013.
http://www.best-b2b.com/Sub-cat/592/593/surveillance-control date prior to Jan. 25, 2013.
http://bulletcameras.wordpress.com Date prior to Jan. 25, 2013.
http://www.maxmax.com Date prior to Jan. 25, 2013.
http://procompvideo.com Date prior to Jan. 25, 2013.
http://dcrsecurity.com Date prior to Jan. 25, 2013.
http://salestores.com Date prior to Jan. 25, 2013.
http://www.bhphotovideo.com Date prior to Jan. 25, 2013.
http://www.diytrade.com Date prior to Jan. 25, 2013.
http://www.asia.ru Date prior to Jan. 25, 2013.
http://www.clintonelectronics.com Date prior to Jan. 25, 2013.
http://www.cctv-security-camera-systems.com Date prior to Jan. 25, 2013.
http://www.dtsdigitalcctv.co.uk Date prior to Jan. 25, 2013.
http://www.gatetec.se Date prior to Jan. 25, 2013.
http://eyewitnesssystems.com Date prior to Jan. 25, 2013.
http://www.footprintsecurity.com.au Date prior to Jan. 25, 2013.

* cited by examiner